US012669347B2

(12) United States Patent
Nordbruch

(10) Patent No.: US 12,669,347 B2
(45) Date of Patent: Jun. 30, 2026

(54) METHOD FOR RELEASING A DIGITAL MAP

(71) Applicant: Robert Bosch GmbH, Stuttgart (DE)

(72) Inventor: Stefan Nordbruch, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 150 days.

(21) Appl. No.: 18/175,200

(22) Filed: Feb. 27, 2023

(65) Prior Publication Data

US 2023/0296399 A1    Sep. 21, 2023

(30) Foreign Application Priority Data

Mar. 21, 2022    (DE) ..................... 10 2022 202 719.1

(51) Int. Cl.
G01C 21/00        (2006.01)
B60W 30/06        (2006.01)

(52) U.S. Cl.
CPC ......... G01C 21/3811 (2020.08); B60W 30/06 (2013.01)

(58) Field of Classification Search
CPC ........................... G01C 21/3811; B60W 30/06
See application file for complete search history.

(56) References Cited

U.S. PATENT DOCUMENTS

2020/0211392 A1*    7/2020    Yu ......................... G05D 1/0214

FOREIGN PATENT DOCUMENTS

| | | |
|---|---|---|
| DE | 102009045817 A1 | 4/2010 |
| DE | 102012222562 A1 | 6/2014 |
| DE | 102014013672 A1 | 4/2015 |
| DE | 102014011697 A1 | 2/2016 |
| DE | 102014015073 A1 *  4/2016 ............. G01C 21/04 |
| DE | 102017207441 A1 *  11/2018 ............ B60W 30/16 |
| DE | 102020211478 A1 | 3/2022 |

* cited by examiner

*Primary Examiner* — Aryan E Weisenfeld
*Assistant Examiner* — Jeffrey R Chalhoub
(74) *Attorney, Agent, or Firm* — NORTON ROSE FULBRIGHT US LLP

(57) ABSTRACT
A method for releasing a digital map of an infrastructure for use for infrastructure-based, at least partly automated guidance of a motor vehicle within the infrastructure. The method includes: receiving area signals representing an area of the infrastructure; testing the digital map for suitability for use for infrastructure-based, at least partly automated guidance of a motor vehicle within the infrastructure based on the area signals; releasing the digital map of the infrastructure for use for infrastructure-based, at least partly automated guidance of a motor vehicle within the infrastructure based on the test of the digital map for suitability. A device, a computer program, and a machine-readable storage medium, are also described.

9 Claims, 2 Drawing Sheets receive area signals — 101 test digital map for suitability — 103 release digital map for use — 105 device configured to carry out method — 201

METHOD FOR RELEASING A DIGITAL MAP

CROSS REFERENCE

The present application claims the benefit under 35 U.S.C. § 119 of German Patent Application No. DE 10 2022 202 719.1 filed on Mar. 21, 2022, which is expressly incorporated herein by reference in its entirety.

FIELD

The present invention relates to a method for releasing a digital map of an infrastructure for use for infrastructure-based, at least partly automated guidance of a motor vehicle within the infrastructure, a device, a computer program, and a machine-readable storage medium.

BACKGROUND INFORMATION

German Patent Application No. DE 10 2012 222 562 A1 describes a system for managed parking areas for transferring a vehicle from a start position to a target position.

SUMMARY

An object of the present invention is to provide efficient releasing a digital map of an infrastructure for use for infrastructure-based, at least partly automated guidance of a motor vehicle within the infrastructure.

This object may be achieved by features of the present invention. Advantageous embodiments of the present invention are disclosed herein.

According to a first aspect of the present invention, a method for releasing a digital map of an infrastructure for use for infrastructure-based, at least partly automated guidance of a motor vehicle within the infrastructure is provided. According to an example embodiment of the present invention, the method includes the following steps:

receiving area signals representing an area of the infrastructure;

testing the digital map for suitability for use for infrastructure-based, at least partly automated guidance of a motor vehicle within the infrastructure based on the area signals;

releasing the digital map of the infrastructure for use for infrastructure-based, at least partly automated guidance of a motor vehicle within the infrastructure based on the test of the digital map for suitability.

According to a second aspect of the present invention, a device is provided, which is configured to carry out all steps of the method according to the first aspect.

According to a third aspect of the present invention, a computer program is provided, which comprises instructions that, when the computer program is executed by a computer, for example by the device according to the second aspect, cause said computer to carry out a method according to the first aspect.

According to a fourth aspect of the present invention, a machine-readable storage medium is provided, on which the computer program according to the third aspect is stored.

The present invention is based on and includes the finding that the above object may be achieved in that, prior to using the digital map for infrastructure-based, at least partly automated guidance of a motor vehicle within the infrastructure, said map is first tested for its suitability, wherein this suitability test is performed based on the area signals representing an area of the infrastructure. Within the scope of this suitability test, a comparison between the digital map and the area of the infrastructure takes place in order to determine differences, for example.

The background is that a digital map that is to be used for infrastructure-based, at least partly automated guidance of a motor vehicle within an infrastructure must be up-to-date, i.e., in particular must correctly indicate where which objects are located within the infrastructure.

A comparison between the digital map and the infrastructure thus takes place to test the digital map.

Only if the test has shown that the digital map is suitable for corresponding use, the digital map is released. Otherwise, the digital map is not released.

This, in particular, may bring about the technical advantage that it can be efficiently ensured that a digital map of an infrastructure is only used for infrastructure-based, at least partly automated driving of the motor vehicle if it is suitable.

In one embodiment of the method, it is provided that the digital map is not released if the test for suitability has shown that the digital map is unsuitable. For example, the digital map is released if the test has shown that the digital map is suitable.

In one embodiment of the method of the present invention, it is provided that the released digital map is used for infrastructure-based, at least partly automated guidance of a motor vehicle within the infrastructure.

By using area signals representing an area of the infrastructure for the test, the suitability test can be performed efficiently.

In particular, a concept for efficiently releasing a digital map of an infrastructure for use for infrastructure-based, at least partly automated guidance of a motor vehicle within the infrastructure is thus provided.

In one embodiment of the method of the present invention, it is provided that the test comprises a determination of whether an object present in the digital map is also present in the infrastructure, or vice versa.

This, for example, may bring about the technical advantage that the test can be performed efficiently.

In an up-to-date map, an object present in the digital map should also be present in the infrastructure, and vice versa. If this is not the case, this may be an indication that the digital map is not up-to-date, i.e., outdated. In such a case, it may, for example, be determined that the digital map is not suitable; otherwise, that it is suitable.

In one embodiment of the method of the present invention, it is provided that if an object is present in both the digital map and the infrastructure, the test comprises a determination of at least one property of the object present in the infrastructure and a comparison of the at least one determined position to a corresponding property of the object present in the digital map. This, for example, may bring about the technical advantage that the test can be performed efficiently.

For an up-to-date map, a property of an object present in the digital map should match a corresponding property of an object present in the infrastructure. If this is not the case, this may be an indication of an outdated digital map. In such a case, it may, for example, be determined that the digital map is unsuitable; otherwise, that it is suitable.

If the singular is used for the property, the plural should always be implied, and vice versa.

In one embodiment of the method of the present invention, it is provided that the at least one property is an element selected from the following group of properties: position, speed, acceleration, object type, length, height, width, shape, color.

This, for example, may bring about the technical advantage that particularly suitable properties can be used.

In one embodiment of the method of the present invention, it is provided that if an object is present in the infrastructure but not in the digital map, the digital map is updated such that the object present in the infrastructure is also present in the digital map, wherein the updated digital map is released for use for infrastructure-based, at least partly automated guidance of a motor vehicle within the infrastructure.

This, for example, may bring about the technical advantage that the digital map can be updated efficiently so that the updated digital map can subsequently be released for corresponding use. In such a case, it is thus not the non-updated digital map that is released but only the updated digital map.

It can thus be efficiently ensured that an up-to-date digital map of the infrastructure is used for the infrastructure-based, at least partly automated guidance of a motor vehicle within the infrastructure.

According to one embodiment of the method of the present invention, it is provided that one, several or all steps of the method are carried out on the infrastructure side and/or by means of a motor vehicle located within the infrastructure and/or by means of an entity providing the digital map.

This, for example, may bring about the technical advantage that the method can be performed efficiently.

In one embodiment of the method of the present invention, it is provided that the infrastructure and/or the motor vehicle and/or the entity are each a component of an event chain for infrastructure-based, at least partly automated guidance of a motor vehicle within an infrastructure, wherein the event chain as a whole and/or one or more components of the event chain have a predetermined safety integrity level, in particular an ASIL and/or a SIL.

This, for example, may bring about the technical advantage that it can be efficiently ensured that the method can be carried out safely.

In one embodiment of the method of the present invention, it is provided that the infrastructure comprises one or more of the following infrastructure elements: parking lot, tunnel, highway ramp, highway exit, junction, in particular roundabout, crossing, intersection, T-junction, crosswalk, construction site, bridge, underpass, parking garage, toll plaza.

This, for example, may bring about the technical advantage that the motor vehicle can be guided in an infrastructure-based, at least partly automated manner in particularly important infrastructure elements based on a released digital map.

For example, a component of the event chain is one of the following components: environmental sensor, control unit of the motor vehicle, main control unit of the motor vehicle, communication interface of the motor vehicle, communication interface of the infrastructure, computer configured to determine infrastructure assistance data for infrastructure-based, at least partly automated guidance of a motor vehicle within an infrastructure, cloud infrastructure in which one or more components of the infrastructure are implemented.

Unless otherwise specified, a component within the meaning of the description is, for example, an infrastructure-side component or a vehicle-side component.

One component of the event chain is, for example, the motor vehicle.

One component of the event chain is, for example, the entity.

In one embodiment of the method, it is provided that the method is a computer-implemented method.

Method features result analogously from corresponding device features, and vice versa. This means that technical functionalities of the device result analogously from corresponding functionalities of the method, and vice versa.

Infrastructure-based, at least partly automated guidance of the motor vehicle comprises, for example, infrastructure-based assistance of the motor vehicle during a trip, guided in an at least partly automated manner, within the infrastructure, for example, within a parking lot.

For example, in one embodiment of the method according to the first aspect of the present invention, it is provided that the motor vehicle performs an AVP operation within the parking lot.

The abbreviation "AVP" stands for "Automated Valet Parking" and can be translated into German as "automatischer Parkservice." An AVP operation comprises, for example, at least highly automated guidance of the motor vehicle from a drop-off position to a parking position and, for example, at least highly automated guidance of the motor vehicle from a parking position to a pick-up position. At the drop-off position, a driver of the motor vehicle drops the motor vehicle off for an AVP operation. At a pick-up position, the motor vehicle is picked up after the AVP operation has ended.

A motor vehicle within the meaning of the description can thus also be referred to as an AVP motor vehicle insofar as it is configured, for example, to perform an AVP operation.

For example, it is provided that the AVP operation comprises an AVP operation according to AVP type 1, 2, and/or 3, wherein AVP type 1 is a vehicle-centered AVP operation, wherein AVP type 2 is an infrastructure-centered AVP operation, and wherein AVP type 3 is a shared vehicle-infrastructure AVP operation.

This, for example, may bring about the technical advantage that the AVP operation can be performed efficiently.

AVP type 1 denotes a vehicle-centered AVP operation. The primary responsibility for the AVP operation rests with the motor vehicle.

AVP type 2 denotes an infrastructure-centered AVP operation. The primary responsibility for the AVP operation rests with the infrastructure, i.e., with the AVP system.

AVP type 3 denotes a shared vehicle-infrastructure AVP operation. Here, a primary responsibility for the AVP operation is shared between the motor vehicle and the AVP system.

An AVP operation comprises the following operations or functions:

1. Determining a target position, located within the parking lot, for the motor vehicle.
2. Planning a route from a start position, comprised by the parking lot, to the target location.
3. Detecting an object and/or an event and responding accordingly to a detected object and/or a detected event.
4. Locating the motor vehicle within the parking lot.
5. Calculating a desired trajectory for the motor vehicle based on the planned route.
6. Controlling a lateral and longitudinal guidance of the motor vehicle based on the calculated desired trajectory.

An assignment as to which of these operations or functions are performed, depending on the AVP type, by the motor vehicle or by an infrastructure-side AVP system, which may comprise, for example, the system according to the second aspect, is indicated by the following table, wherein "I" stands for "infrastructure," i.e., for the AVP system, and "K" stands for "motor vehicle" so that "I" indicates that the operation is performed by the AVP system, and "K" indicates that the operation is performed by the motor vehicle:

| Functions | AVP type 1 | AVP type 2 | AVP type 3 |
|---|---|---|---|
| Determining a target position, located within the parking lot, for the motor vehicle. | I & K | I | I |
| Planning a route from a start position, comprised by the parking lot, to the target location. | K | I | I |
| Detecting an object and/or an event and responding accordingly to a detected object and/or a detected event. | K (& optionally I) | I | I & K |
| Locating the motor vehicle within the parking lot. | K | I | K |
| Calculating a desired trajectory for the motor vehicle based on the planned route. | K | I | K |
| Controlling a lateral and longitudinal guidance of the motor vehicle based on the calculated desired trajectory. | K | K | K |

The table above thus indicates specifically for each AVP type for each function whether the function is performed by the infrastructure, i.e., by an infrastructure-side AVP system, or by the motor vehicle, i.e., for example, by a vehicle-side AVP system. In some cases, it may be provided that the function is carried out by both the infrastructure-side AVP system and the motor vehicle, i.e., the vehicle-side AVP system.

With regard to object detection and event detection for AVP type 1, it may optionally be provided that in addition to the motor vehicle, the AVP system of the infrastructure also carries out this function.

The AVP types 1, 2, and 3 described herein are also described in detail in ISO 23374.

The phrase "at least partly automated guidance" includes one or more of the following cases: assisted guidance, partly automated guidance, highly automated guidance, fully automated guidance. The phrase "at least partly automated" thus includes one or more of the following phrases: assisted, partly automated, highly automated, fully automated.

Assisted guidance means that a driver of the motor vehicle permanently carries out either the lateral or the longitudinal guidance of the motor vehicle. The respectively other driving task (i.e., controlling the longitudinal or lateral guidance of the motor vehicle) is performed automatically. That is to say, in an assisted guidance of the motor vehicle, either the lateral guidance or the longitudinal guidance is controlled automatically.

Partly automated guidance means that in a specific situation (for example: driving on a highway, driving within a parking lot, overtaking an object, driving within a lane defined by lane markings) and/or for a certain period of time, longitudinal and lateral guidance of the motor vehicle is automatically controlled. A driver of the motor vehicle does not have to manually control the longitudinal and lateral guidance of the motor vehicle. However, the driver must continually monitor the automatic control of the longitudinal and lateral guidance in order to be able to manually intervene if necessary. The driver must be ready at all times to fully take over motor vehicle guidance.

Highly automated guidance means that for a certain period of time, in a specific situation (for example: driving on a highway, driving within a parking lot, overtaking an object, driving within a lane defined by lane markings), longitudinal guidance and lateral guidance of the motor vehicle are controlled automatically. A driver of the motor vehicle does not have to manually control the longitudinal and lateral guidance of the motor vehicle. The driver does not need to continually monitor the automatic control of the longitudinal and lateral guidance in order to be able to manually intervene if necessary. If necessary, a take-over request is automatically issued to the driver to take over control of the longitudinal and lateral guidance, in particular issued with adequate time to spare. The driver thus must potentially be able to take control of the longitudinal and lateral guidance. Limits of automatically controlling the lateral and longitudinal guidance are recognized automatically. In the case of highly automated guidance, it is not possible to automatically bring about a minimum-risk condition in every initial situation.

Fully automated guidance means that in a specific situation (for example: driving on a highway, driving within a parking lot, overtaking an object, driving within a lane defined by lane markings), longitudinal guidance and lateral guidance of the motor vehicle are controlled automatically. A driver of the motor vehicle does not have to manually control the longitudinal and lateral guidance of the motor vehicle. The driver does not need to monitor the automatic control of the lateral and longitudinal guidance in order to be able to manually engage if necessary. Before ending the automatic control of the lateral and longitudinal guidance, the driver is automatically asked to take over the driving task (controlling the lateral and longitudinal guidance of the motor vehicle), in particular with a sufficient time reserve. If the driver does not take over the driving task, it is automatically returned to a minimum-risk condition. Limits of automatically controlling the lateral and longitudinal guidance are recognized automatically. In all situations, it is possible to automatically return to a minimum-risk system condition.

For example, an environmental sensor within the meaning of the description is one of the following environmental sensors: radar sensor, image sensor, in particular image sensor of a video camera, ultrasonic sensor, LiDAR sensor, magnetic field sensor and infrared sensor.

In one embodiment of the present invention, one or more environmental sensors are arranged spatially distributed within the infrastructure. For example, it is provided that one or more of these environmental sensors detect an area of the infrastructure and output corresponding area signals based on the detection.

For example, the motor vehicle comprises one or more environmental sensors that each detect an area of the infrastructure, in the present case an environment of the motor vehicle, and output corresponding area signals based on the respective detection.

The above environmental signals from the environmental sensors of the infrastructure and/or of the motor vehicle may, for example, be used for the step of testing for suitability.

The phrase "infrastructure-assisted driving" is often used in English for the phrase "infrastructure-based, at least partly automated guidance."

Within the meaning of the description, the German word "sicker" in particular means "safe" and "secure." While these two English terms are usually translated into German as "sicker," they have a partly different meaning in English.

The term "safe" is used in particular to refer to the topic of accidents and accident prevention. "Safe" thus, in particular, means that measures ensure the correct function of the event chain and that a correct flow of infrastructure-based, at least partly automated guidance of a motor vehicle within an infrastructure is ensured.

The term "secure" is used in particular to refer to the topic of computer protection and hacker protection, i.e., in particular: How secure is the event chain and its components against unauthorized access and against data manipulation by third parties, so-called hackers? An event chain that is "secure" thus, in particular, has adequate and sufficient computer protection and hacker protection.

Testing for suitability of the digital maps can thus, in particular, may bring about the technical advantage that it can be efficiently ensured that a secure digital map is used for the at least partly automated guidance of the motor vehicle so that the at least partly automated guidance is safe within the meaning of the description, i.e., in particular "sicker" within the meaning of the English terms "safe" and "secure."

The abbreviation "ASIL" stands for the English term "Automotive Safety Integrity Level," which may be translated into German as "Automotive Sicherheitsintegrität-slevel." The automotive safety integrity level is a key component of the ISO 26262 standard. ASIL distinguishes between four different ASIL risk levels denoted by ASIL-A, ASIL-B, ASIL-C, and ASIL-D.

The abbreviation "SIL" stands for the English term "Safety Integrity Level," which may be translated into German as "Sicherheitsintegritätslevel." The safety integrity level is a key component of the IEC EN 61508 standard. SIL distinguishes between four different SIL risk levels denoted by SIL-1, SIL-2, SIL-3, and SIL-4.

In particular, the term "infrastructure-based assistance of a motor vehicle" means that infrastructure assistance data are provided to the motor vehicle. The motor vehicle can, for example, derive instructions for action based on the infrastructure assistance data. For example, based on the infrastructure assistance data, the motor vehicle itself can decide what to do.

Infrastructure assistance data include, for example, one or more of the following data elements: control command for the at least partly automated control of a lateral and/or longitudinal guidance of the motor vehicle, remote control command for the at least partly automated, remote control of a lateral and/or longitudinal guidance of the motor vehicle, release command for releasing an at least partly automated, in particular fully automated, trip of the motor vehicle for a particular time in a particular area of the infrastructure, desired trajectory for the motor vehicle, target location within the infrastructure, environmental data representing an environment of the motor vehicle, specification as to what the motor vehicle should do. The specification specifies, for example, whether the motor vehicle is, for example, permitted to drive or must stop, for example.

The terms "assist" and "support" may be used synonymously.

The abbreviation "at least one" means "one or more."

The present invention is explained in more detail below using preferred exemplary embodiments.

DETAILED DESCRIPTION OF EXAMPLE EMBODIMENTS

Figure 1:
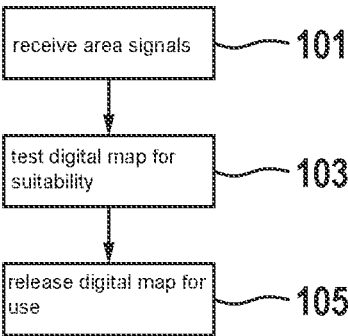
FIG. 1 shows a flow chart of an example method according to the first aspect of the present invention.

FIG. 1 illustrates a flow chart of a method for releasing a digital map of an infrastructure for use for infrastructure-based, at least partly automated guidance of a motor vehicle within the infrastructure, comprising the following steps:

receiving 101 area signals representing an area of the infrastructure;

testing 103 the digital map for suitability for use for infrastructure-based, at least partially automated guidance of a motor vehicle within the infrastructure based on the area signals;

releasing 105 the digital map of the infrastructure for use for infrastructure-based, at least partly automated guidance of a motor vehicle within the infrastructure based on the test of the digital map for suitability.

In one embodiment of the method, this comprises a detection of the area by one or more environmental sensors of the motor vehicle and/or by one or more environmental sensors of the infrastructure in order to output area signals based on the respective detection. These area signals represent the detected area of the infrastructure.

In one embodiment of the method, it is provided that infrastructure assistance data for infrastructure-based, at least partly automated guidance of a motor vehicle within the infrastructure are determined based on the released digital map or based on the released updated digital map. Such infrastructure assistance data can be sent to the motor vehicle, for example.

Sending and receiving within the meaning of the description includes sending and receiving via a communication network, for example a cellular network and/or a WLAN network, i.e., in general, a wireless communication network. A communication network includes, for example, a wired communication network, such as an Ethernet communication network.

In one embodiment of the method, it is provided that control signals for at least partly automated control of a lateral and/or longitudinal guidance of the motor vehicle within the infrastructure are generated and output based on the released digital map or based on the released updated digital map.

Figure 2:
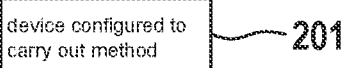
FIG. 2 shows an example device according to the second aspect of the present invention.

FIG. 2 shows a device 201 according to the second aspect, which is configured to carry out all steps of the method according to the first aspect.

Figure 3:
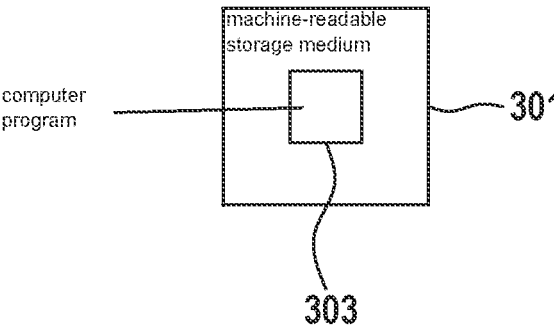
FIG. 3 shows an example machine-readable storage medium according to the third aspect of the present invention.

FIG. 3 shows a machine-readable storage medium 301, in which a computer program 303 is stored. The computer program 303 comprises instructions that, when the computer program 303 is executed by a computer, cause the latter to carry out a method according to the first aspect.

Figure 4:
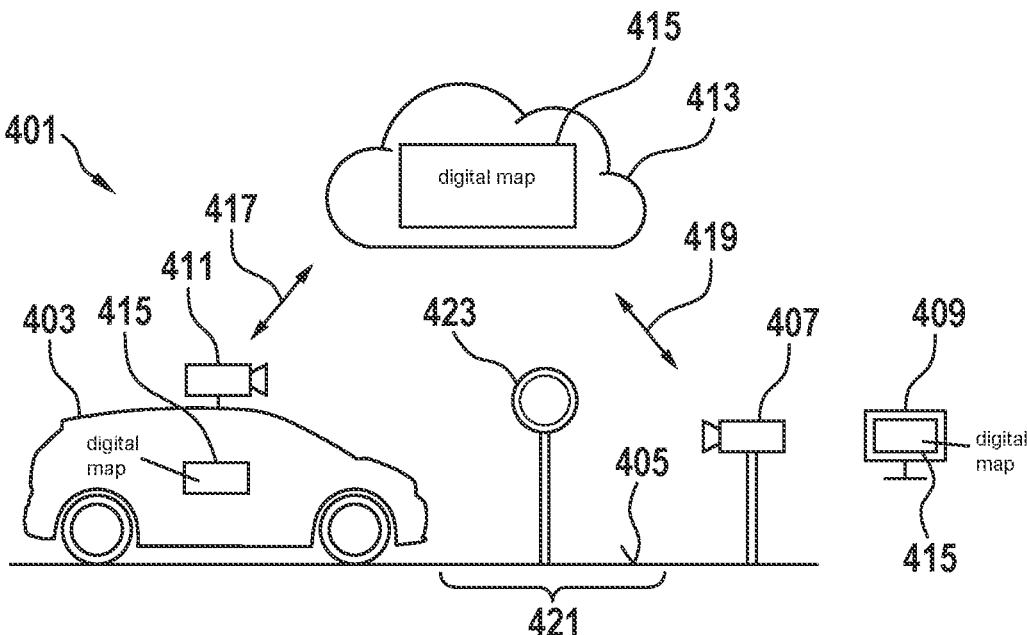
FIG. 4 shows an infrastructure, according to an example embodiment of the present invention.

FIG. 4 shows an infrastructure 401, which may, for example, be a parking lot. Within the infrastructure 401, a motor vehicle 403 drives on a roadway 405. A first video camera 407 comprising an image sensor (not shown) is arranged within the infrastructure 401. Also arranged within the infrastructure 401 is a computer 409 configured, for example, to carry out method steps of the method according to the first aspect.

The motor vehicle 403 comprises a second video camera 411 comprising an image sensor (not shown).

In an embodiment not shown, it is, for example, provided that in addition to or instead of the first video camera 407 and/or the second video camera 411, further environmental sensors of the infrastructure and/or of the motor vehicle are provided.

A cloud infrastructure 413 is also provided, which may, for example, be encompassed by the infrastructure 401.

The cloud infrastructure 413 stores a digital map 415 of the infrastructure 401, i.e., of the parking lot, for example. This digital map 415 is also stored in the computer 409 and in the motor vehicle 403.

The cloud infrastructure 413 can be an entity that provides the digital map 415.

A communication link between the motor vehicle 403 and the cloud infrastructure 413 is symbolically denoted by a double arrow with reference sign 417. A communication link between the infrastructure 401, i.e., in particular, between the computer 409 and/or the first video camera 407, and the cloud infrastructure 413 is symbolically denoted by a double arrow with reference sign 419.

These communication links 417, 419 are, for example, established via a WLAN and/or cellular network, among others.

The first video camera 407 detects an area 421 of the infrastructure 401. This area 421 is also detected by the second video camera 411 of the motor vehicle 403.

A traffic sign 423 is located within the area 421. It is now tested, for example by means of the motor vehicle 403 and/or by means of the infrastructure 401, i.e., in particular, by means of the computer 409, and/or by means of the cloud infrastructure 413, whether or not the traffic sign 423 detected by the first video camera 407 and/or by the second video camera 411 is present in the digital map 415. If the traffic sign 423 is present in the digital map 415, the digital map 415 is, for example, released in order to use guide the motor vehicle 403 in an infrastructure-based, at least partly automated manner based thereon. Otherwise, the digital map 415 is not released. For example, in such a case, it may be provided that the digital map 415 is updated so that the updated digital map includes the traffic sign 423. This updated digital map may then, for example, be released for use for infrastructure-based, at least partly automated guidance of the motor vehicle 403 within the infrastructure 401.

In summary, the concept described herein is based in particular on a digital map being tested on the vehicle side and/or on the infrastructure side for its suitability with regard to infrastructure-based, at least partly automated guidance of a motor vehicle within the infrastructure and being confirmed, for example, if suitable.

On the basis of the test for suitability, it is thus efficiently ensured that the digital map is safe within the meaning of the description.

For example, it is provided that deviations and/or changes in the infrastructure that do not match the digital map are entered into the digital map. The digital map is thus updated accordingly. Such a deviation or change may, for example, be that a traffic sign has been moved and/or its position changed. For example, a traffic sign may have been bent because another motor vehicle collided with it. Such changes can then be entered into the digital map so that the digital map is updated accordingly so that the correspondingly updated digital map can be used accordingly in order to guide a motor vehicle within the infrastructure in an infrastructure-based, at least partly automated manner.

For example, the digital map is updated with new data, for example because a new traffic sign is present.

The method steps, in particular testing and/or releasing and/or receiving, can be performed, for example, on the vehicle side and/or on the infrastructure side and/or by an entity providing the digital map. Such an entity is, for example, a map operator.

For example, it is provided that the components of the event chain are safe within the meaning of the description for infrastructure-based, at least partly automated guidance of a motor vehicle and/or that the event chain as a whole is safe within the meaning of the description, which can in particular be ensured in that the components of the event chain and/or the event chain as a whole have a predetermined safety integrity level.

What is claimed is:

1. A method for releasing a digital map of an infrastructure for use for infrastructure-based, at least partly automated guidance of a motor vehicle within the infrastructure, the method comprising the following steps:

receiving area signals representing an area of the infrastructure;

testing the digital map for suitability for use for the infrastructure-based, at least partly automated guidance of the motor vehicle within the infrastructure based on the area signals; and releasing the digital map of the infrastructure for use for the infrastructure-based, at least partly automated guidance of the motor vehicle within the infrastructure based on the test of the digital map for suitability, only when the test yields a positive result indicating suitability;

preventing a release of the digital map for said use when the test yields a negative result indicating unsuitability, wherein, in an instance where the negative result is caused by an object being present in the infrastructure but not in the digital map, the method further comprises, subsequent to preventing the release of the digital map:

(i) updating the digital map such that the object present in the infrastructure is also present in the digital map, thereby creating an updated digital map, and (ii) releasing the updated digital map for use for the infrastructure-based, at least partly automated guidance of the motor vehicle within the infrastructure, wherein the testing includes a determination of whether an object present in the digital map is also present in the infrastructure, or whether an object present in the infrastructure is also present in the digital map, wherein, based on the object being present in the infrastructure but not in the digital map, the digital map is updated such that the object present in the infrastructure is also present in the digital map, and the updated digital map is released for use for the infrastructure-based, at least partly automated guidance of the motor vehicle within the infrastructure, wherein the area signals are generated by one or more environmental sensors of the motor vehicle and/or one or more environmental sensors of the infrastructure based on a detection of the area, wherein control signals for at least partly automated control of a lateral and/or longitudinal guidance of the motor vehicle within the infrastructure are generated based on the released digital map or based on the released updated digital map, wherein the testing and releasing are performed by an infrastructure-side computer configured to actively validate the digital map and to release the digital map or an updated digital map from the infrastructure to the motor vehicle for use in infrastructure-based, at least partly automated guidance of the motor vehicle within the infrastructure.

2. The method according to claim 1, wherein, based on an object being present in both the digital map and the infrastructure, the testing further comprises a determination of at least one property of the object present in the infrastructure and a comparison of the at least one determined position to a corresponding property of the object present in the digital map.

3. The method according to claim 2, wherein the at least one property is an element selected from the following group of properties: position, speed, acceleration, object type, length, height, width, shape, color.

4. The method according to claim 1, wherein one, several or all steps of the method are carried out on an infrastructure side and/or by a motor vehicle located within the infrastructure and/or by an entity providing the digital map.

5. The method according to claim 4, wherein the infrastructure and/or the motor vehicle and/or the entity are each a component of an event chain for infrastructure-based, at least partly automated guidance of a motor vehicle within an infrastructure, wherein the event chain as a whole and/or one or more components of the event chain have a predetermined safety integrity level, the safety integrity level being an ASIL and/or a SIL.

6. The method according to claim 1, wherein the infrastructure includes one or more of the following infrastructure elements: parking lot, tunnel, highway ramp, highway exit, point of intersection, in particular roundabout, intersection, junction, T-shaped intersection, crosswalk, construction site, bridge, underpass, parking garage, toll plaza.

7. A device configured to release a digital map of an infrastructure for use for infrastructure-based, at least partly automated guidance of a motor vehicle within the infrastructure, the device configured to:

receive area signals representing an area of the infrastructure;

test the digital map for suitability for use for the infrastructure-based, at least partly automated guidance of the motor vehicle within the infrastructure based on the area signals; and release the digital map of the infrastructure for use for the infrastructure-based, at least partly automated guidance of the motor vehicle within the infrastructure based on the test of the digital map for suitability, only when the test yields a positive result indicating suitability;

preventing a release of the digital map for said use when the test yields a negative result indicating unsuitability, wherein, in an instance where the negative result is caused by an object being present in the infrastructure but not in the digital map, the method further comprises, subsequent to preventing the release of the digital map:

(i) updating the digital map such that the object present in the infrastructure is also present in the digital map, thereby creating an updated digital map, and (ii) releasing the updated digital map for use for the infrastructure-based, at least partly automated guidance of the motor vehicle within the infrastructure, wherein the testing includes a determination of whether an object present in the digital map is also present in the infrastructure, or whether an object present in the infrastructure is also present in the digital map, wherein, based on the object being present in the infrastructure but not in the digital map, the digital map is updated such that the object present in the infrastructure is also present in the digital map, and the updated digital map is released for use for the infrastructure-based, at least partly automated guidance of the motor vehicle within the infrastructure, wherein the area signals are generated by one or more environmental sensors of the motor vehicle and/or one or more environmental sensors of the infrastructure based on a detection of the area, wherein control signals for at least partly automated control of a lateral and/or longitudinal guidance of the motor vehicle within the infrastructure are generated based on the released digital map or based on the released updated digital map.

8. A non-transitory machine-readable storage medium on which is stored a computer program for releasing a digital map of an infrastructure for use for infrastructure-based, at least partly automated guidance of a motor vehicle within the infrastructure, the computer program, when executed by a computer, causing the computer to perform the following steps:

receiving area signals representing an area of the infrastructure;

testing the digital map for suitability for use for the infrastructure-based, at least partly automated guidance of the motor vehicle within the infrastructure based on the area signals; and releasing the digital map of the infrastructure for use for the infrastructure-based, at least partly automated guidance of the motor vehicle within the infrastructure based on the test of the digital map for suitability, only when the test yields a positive result indicating suitability;

preventing a release of the digital map for said use when the test yields a negative result indicating unsuitability, wherein, in an instance where the negative result is caused by an object being present in the infrastructure but not in the digital map, the method further comprises, subsequent to preventing the release of the digital map:

(i) updating the digital map such that the object present in the infrastructure is also present in the digital map, thereby creating an updated digital map, and (ii) releasing the updated digital map for use for the infrastructure-based, at least partly automated guidance of the motor vehicle within the infrastructure, wherein the testing includes a determination of whether an object present in the digital map is also present in the infrastructure, or whether an object present in the infrastructure is also present in the digital map, wherein, based on the object being present in the infrastructure but not in the digital map, the digital map is updated such that the object present in the infrastructure is also present in the digital map, and the updated digital map is released for use for the infrastructure-based, at least partly automated guidance of the motor vehicle within the infrastructure, wherein the area signals are generated by one or more environmental sensors of the motor vehicle and/or one or more environmental sensors of the infrastructure based on a detection of the area, wherein control signals for at least partly automated control of a lateral and/or longitudinal guidance of the motor vehicle within the infrastructure are generated based on the released digital map or based on the released updated digital map.

9. The method according to claim 1, wherein the infrastructure comprises a computer configured to control access to the digital map such that the digital map becomes usable for infrastructure-based, at least partly automated guidance of the motor vehicle only after a positive validation of the digital map by the infrastructure, and wherein the infrastructure computer transmits the released digital map or the updated digital map to the motor vehicle for use in the guidance.

* * * * *